Figure 1:
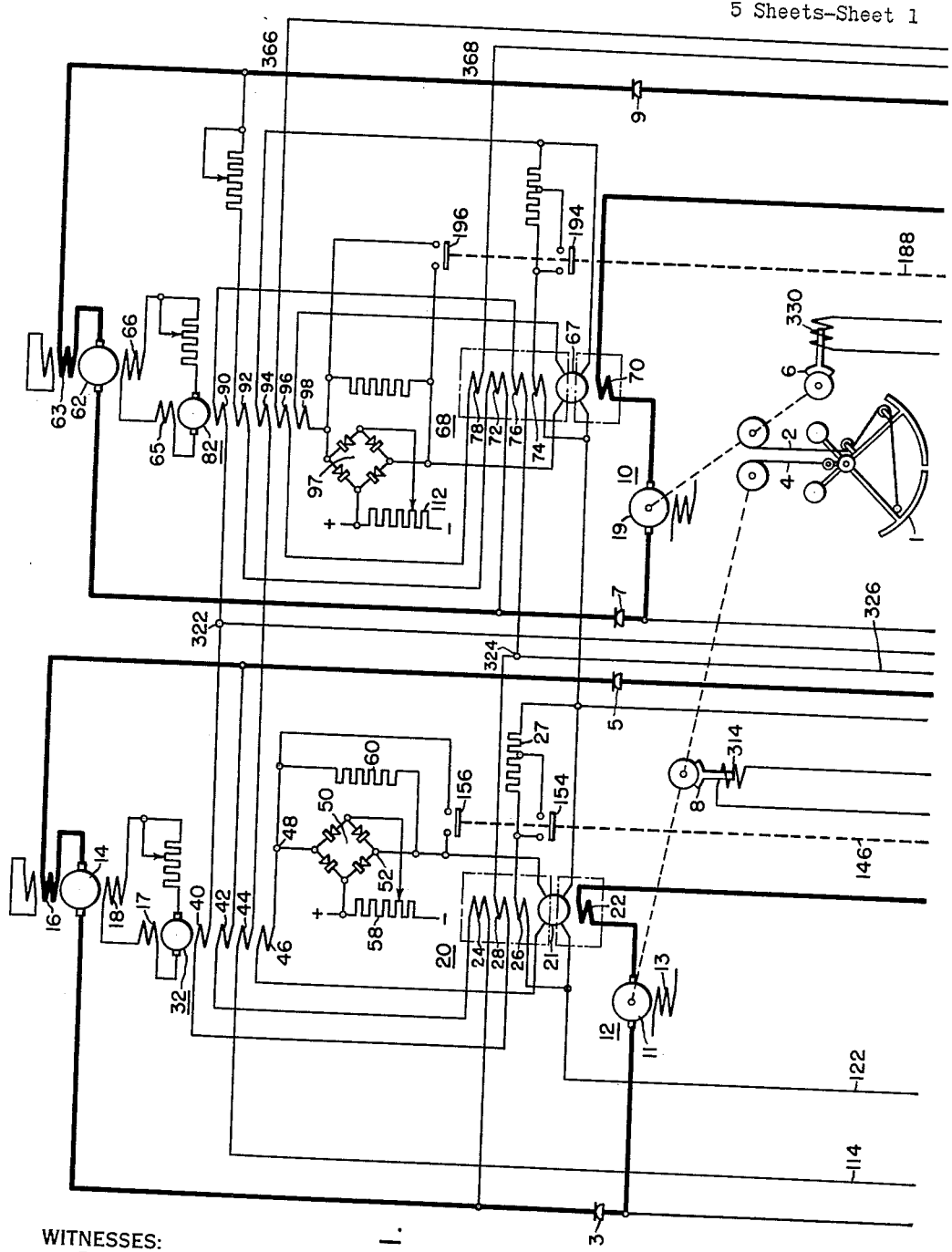

Aug. 2, 1955 G. E. MATHIAS 2,714,696
LOAD DIVISION APPARATUS FOR PLURAL ELECTRIC MOTOR SYSTEMS
Filed Sept. 30, 1952 5 Sheets-Sheet 1

WITNESSES:
Robert A. Baird
Urban H. Faubion

INVENTOR
Gerald E. Mathias.
BY
Paul E. Friedemann
ATTORNEY

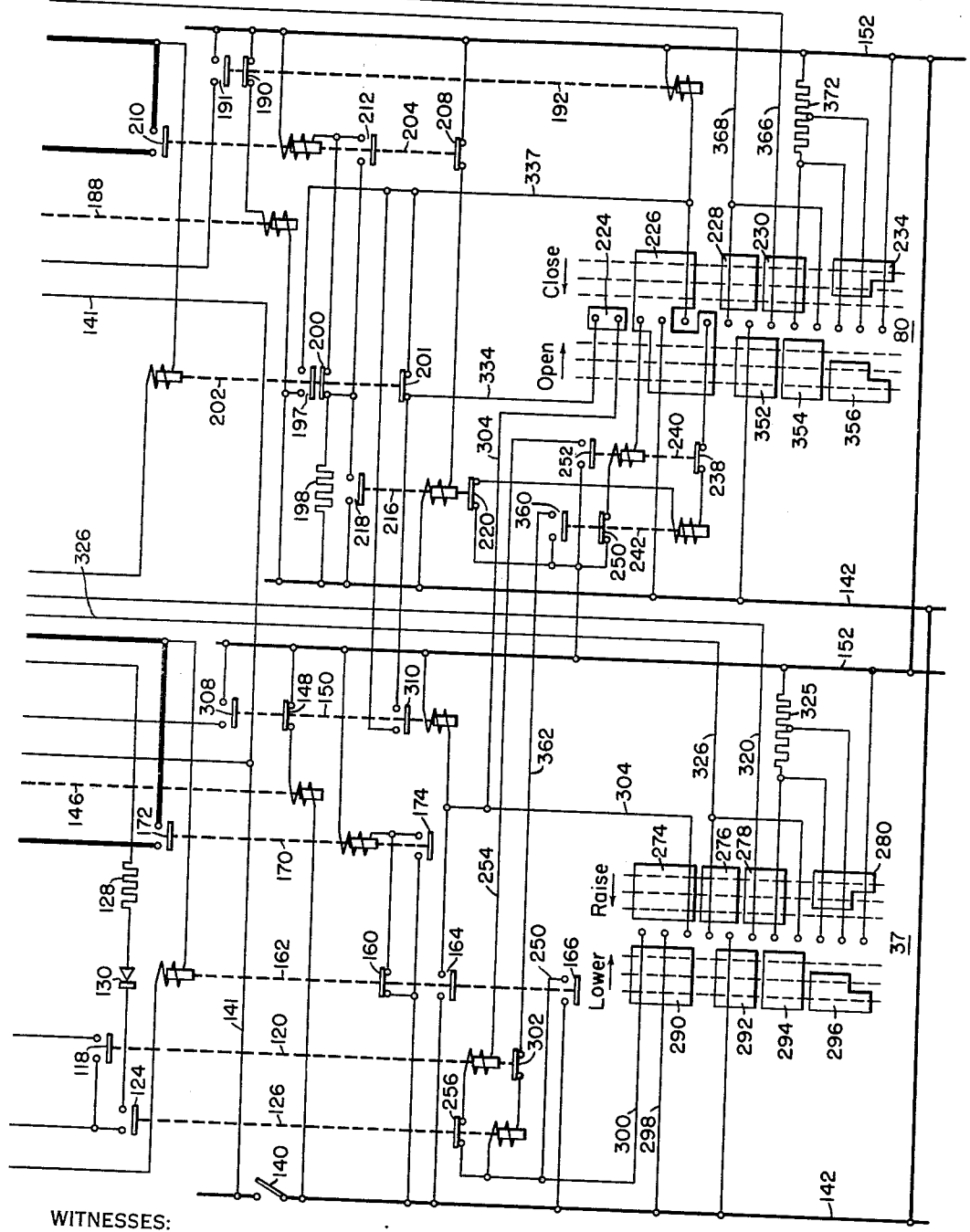
Fig. IA.
INVENTOR
Gerald E. Mathias.

Aug. 2, 1955  G. E. MATHIAS  2,714,696
LOAD DIVISION APPARATUS FOR PLURAL ELECTRIC MOTOR SYSTEMS
Filed Sept. 30, 1952  5 Sheets-Sheet 3

WITNESSES:
Robert C. Baird
Urban H. Taubion

INVENTOR
Gerald E. Mathias.
BY Paul E. Friedemann
ATTORNEY

Aug. 2, 1955

G. E. MATHIAS 2,714,696

LOAD DIVISION APPARATUS FOR PLURAL ELECTRIC MOTOR SYSTEMS

Filed Sept. 30, 1952

5 Sheets-Sheet 4

WITNESSES:
Robert C. Baird
Urban H. Faubion

INVENTOR
Gerald E. Mathias.
BY
Paul E. Frixlemann
ATTORNEY

Aug. 2, 1955 G. E. MATHIAS 2,714,696
LOAD DIVISION APPARATUS FOR PLURAL ELECTRIC MOTOR SYSTEMS
Filed Sept. 30, 1952 5 Sheets-Sheet 5

WITNESSES:
Robert C. Baird
Urban H. Faubion

INVENTOR
Gerald E. Mathias.
BY Paul E. Friedemann
ATTORNEY

United States Patent Office 2,714,696
Patented Aug. 2, 1955

2,714,696
LOAD DIVISION APPARATUS FOR PLURAL ELECTRIC MOTOR SYSTEMS

Gerald E. Mathias, Williamsville, N. Y., assignor to Westinghouse Electric Corporation, East Pittsburgh, Pa., a corporation of Pennsylvania Application September 30, 1952, Serial No. 312,289

16 Claims. (Cl. 318—99)

This invention relates generally to control apparatus for electric motors and more particularly to apparatus for controlling at least two electric motors simultaneously.

This invention is especially applicable to systems which utilize two separate control lines to determine the condition of a load device. One such example is a mooring winch, and another is material handling buckets for ore bridges. The latter example is used here to illustrate the invention.

In systems utilizing two control lines to determine the condition of a load, it has been common practice to supply individual drives for each control line. The operator has one master controller for each drive and must simultaneously actuate the individual drum controllers to obtain the correct distribution of load between the two lines in order to maintain the desired condition of the material handling bucket, and at the same time raise or lower the bucket. This requires skill and concentration on the part of the operator.

In systems of this type, collector circuits are frequently required for transferring electrical power or control signals from a movable location to a fixed portion of the structure. The power collectors utilized in these collector circuits are necessarily heavier than those required for control circuits. In addition, collectors are a source of trouble requiring regular maintenance and their initial cost and weight is undesirable.

It is a general object of this invention to provide reliable electrical control apparatus having a minimum of operating components.

It is also a general object of this invention to provide a control apparatus for at least two electric motors whereby the motors are controlled in dependence upon selected control quantities, and also in accordance with the relationship of the loads on the motors.

A further object of this invention is to provide control apparatus for at least two electric motors whereby the separate control quantities may be supplied to each motor to assure the desired condition of the motor in question and to assure that the other motor is controlled in accordance with the condition of the motor which receives the control quantity to maintain a selected ratio of torques.

Another object of this invention is to provide a control system for at least two electric motors whereby each motor may be separately controlled from separate controlling sources, and which provides load balance between the motors for a given condition of the load device and load unbalance for another condition of the load device.

A still further object of this invention is to provide a control system for at least two electric motors having a common load which comprises separate control means for each motor, one of which is effective to alter the load sharing relationship of the motors.

A more specific object of this invention is to provide a control system for a pair of electric motors having separate control sources whereby provision is made for simultaneously controlling both motors in dependence on the difference in load conditions of said motors to obtain substantially equal load sharing and further, wherein one of said control sources is effective to alter the load-sharing relationship of the motors.

Figure 2:
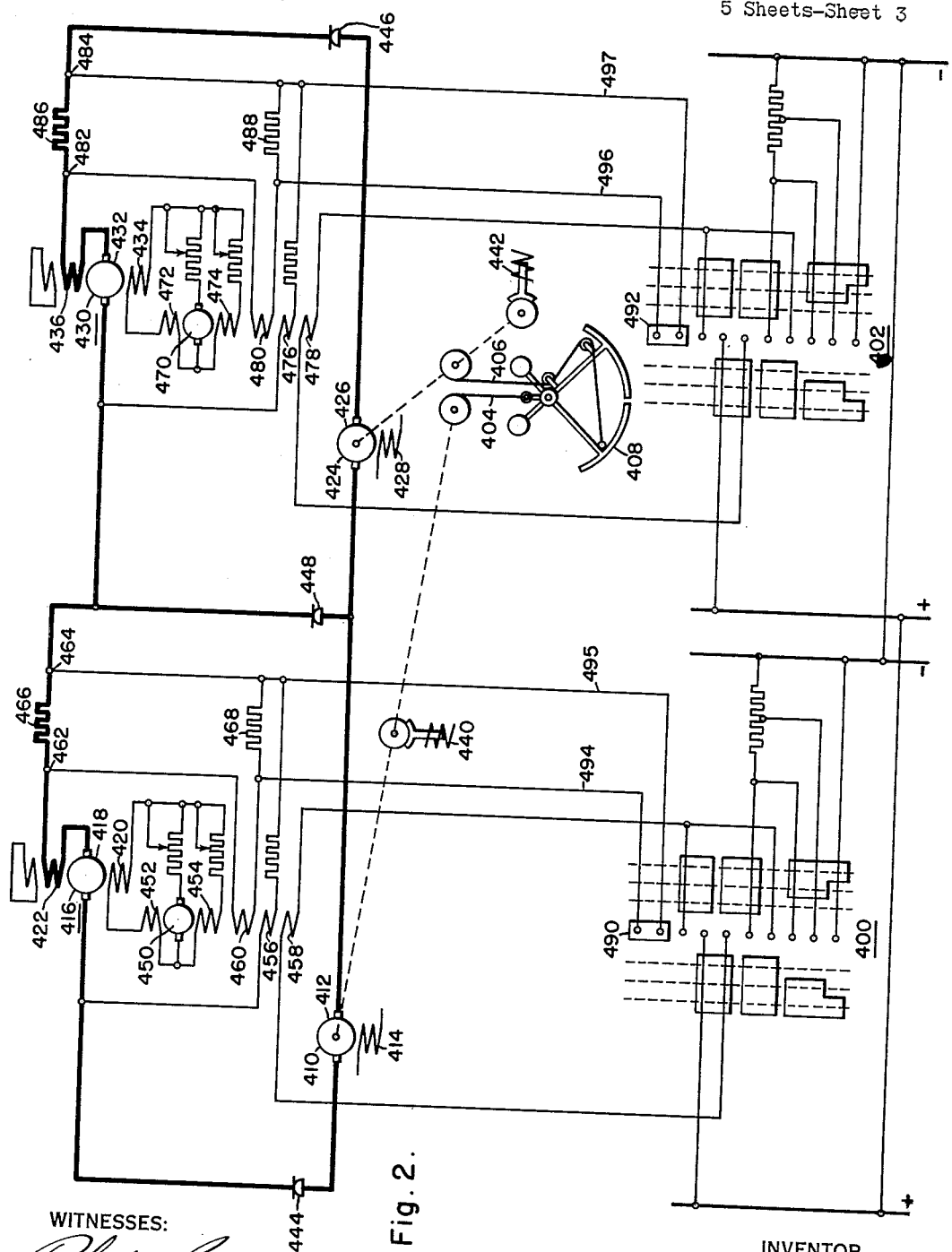
Figure 3:
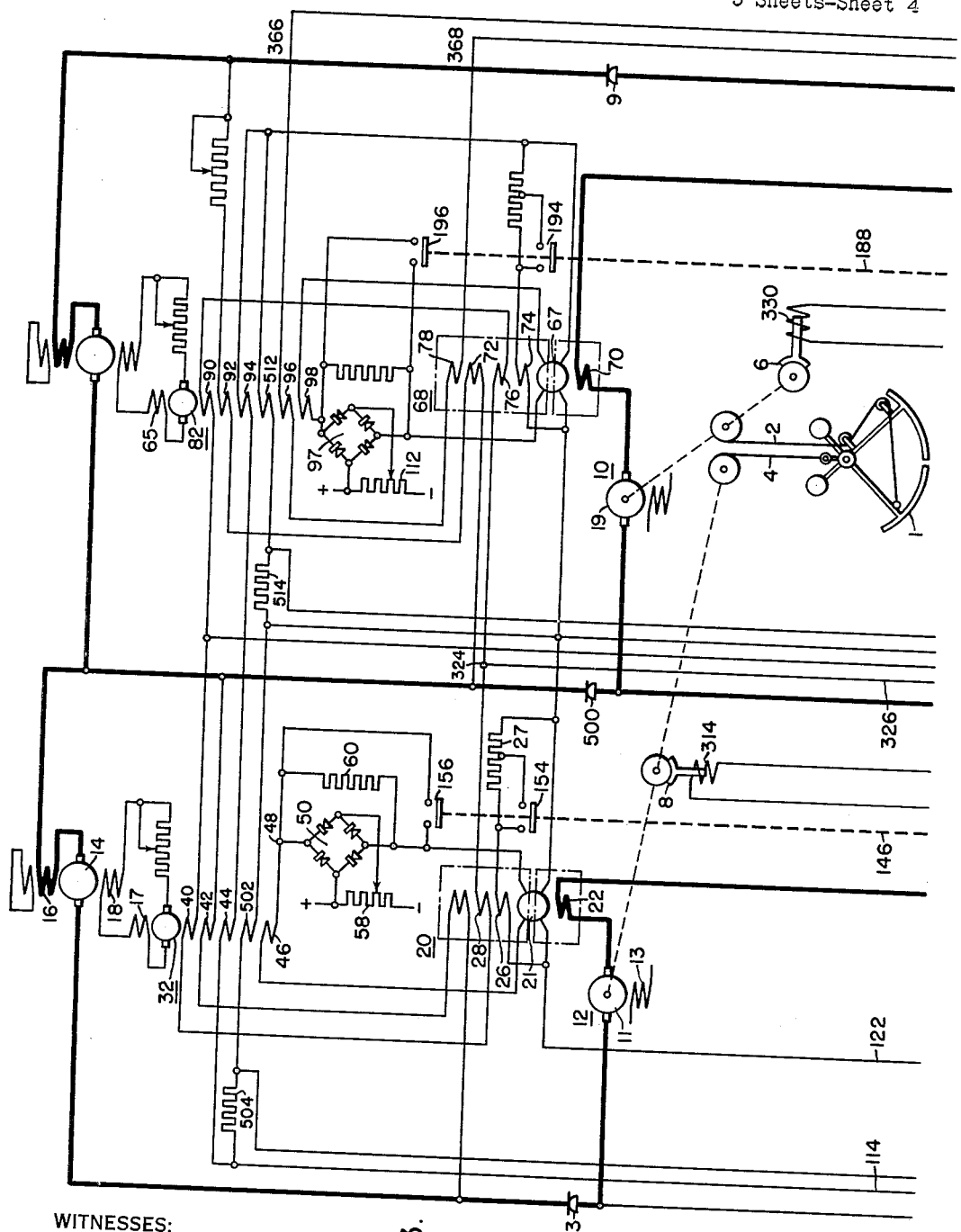
Figure 3A:
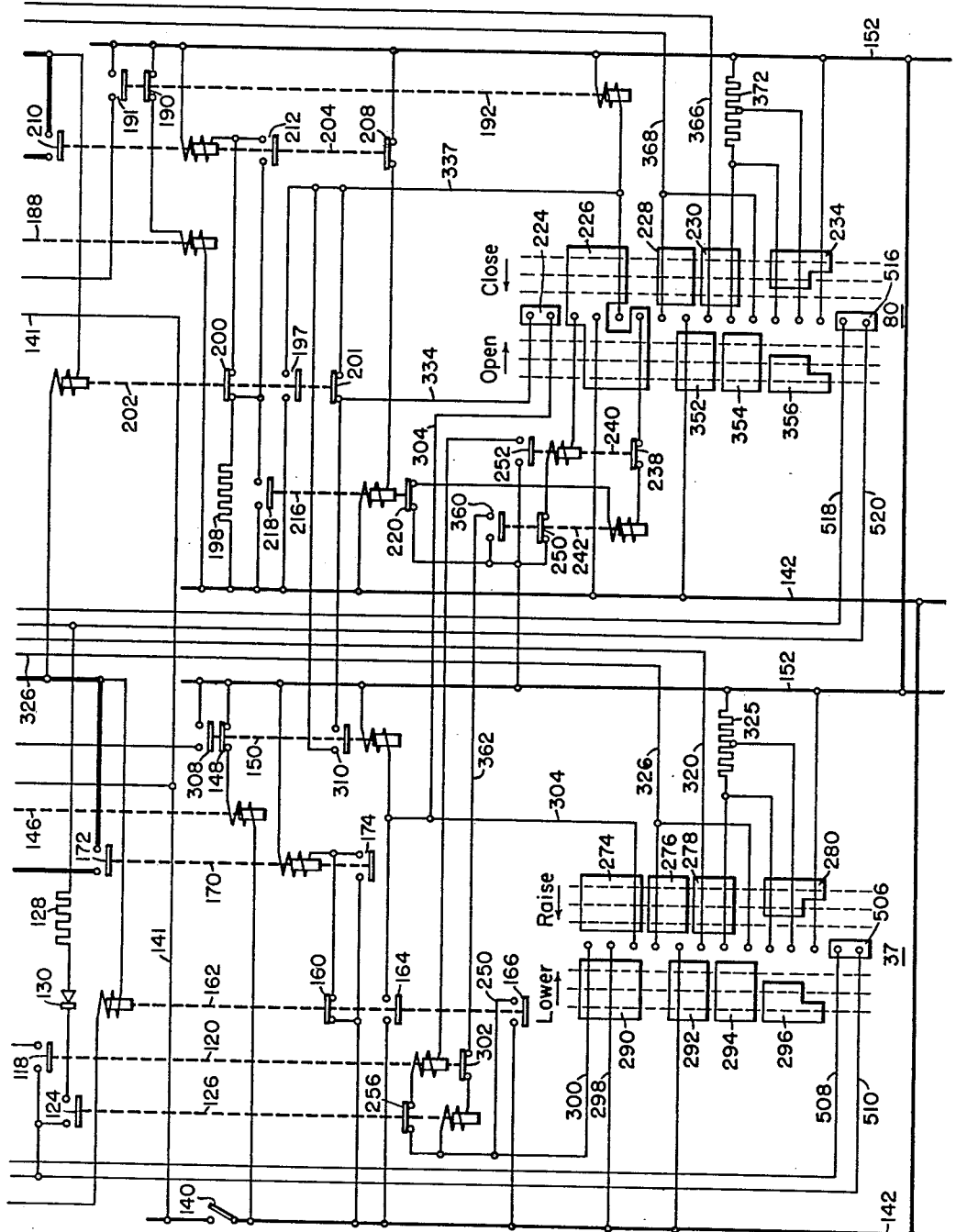

For a better understanding of the invention, reference should be had to the accompanying drawings, wherein:

Figures 1 and 1A combined show a schematic diagram of the control system for a two-line material handling bucket which utilizes principles of the invention;

Fig. 2 also shows a schematic diagram of a control system for a two-line material handlink bucket which illustrates the invention; and Figs. 3 and 3A combined show a schematic diagram of a control system of the character referred to which utilizes the invention.

The schematic diagram of the control system shown in Figs. 1 and 1A combined also illustrates the use of rotating regulators illustrated and described in a copending application of Gerald E. Mathias and William T. Hunt, Jr., filed herewith, entitled "Electrical Control Apparatus," and assigned to the same assignee.

The operation of the main components and their relation will be described first, and later the sequence of operation of the relays and components will be described.

Referring to Figs. 1 and 1A, the material handling bucket 1 is provided with close-line 2 for the purpose of closing the bucket and aiding in the raising and lowering of the bucket, and a hold-line 4 for the purpose of raising and lowering the bucket. A pair of brakes 6 and 8 are utilized for holding the close-line 2 and the hold-line 4 in position when the systems are not in use. A close-line motor 10 and a hold-line motor 12 are used to drive the close-line and the hold-line for the material handling bucket.

The control system for the hold-line motor includes a main hold generator 14 which provides a variable voltage drive for the motor 12. The hold-line motor has a field winding 13 which is energized from a constant potential source. The hold generator has a self-energizing field winding 16 and a separately excited field winding 18.

The rotating regulator 32 controls the excitation of the field winding 18. This generator 32 has a self-energizing field winding 17 and the field winding 18 in its single output circuit, and is also provided with pattern field winding 40, a voltage field winding 42, a load balance field winding 44, and a current limit field winding 46.

The rotating regulator 32 is controlled in its operation by the rotating regulator 20. This rotating regulator generator 20 is of the type that has two substantially independent outputs. The excitation for the lower pair of output terminals is provided by the field windings 22 connected in series with the armature winding 11 of the hold-line motor 12, and the excitation for the upper pair of output terminals is provided by the voltage field winding 24, a pattern field winding 28, and a current field winding 26, the current field winding being excited by the output of the lower pair of output terminals of this rotating regulator.

The close generator 62 has a self-energizing field winding 63 and a separately excited field winding 66 connected in series with the armature and self-energizing field winding 65 of the regulating generator 82. This rotating regulating generator 32 is similar in structure and function to the rotating regulating generator 32 and is controlled by a rotating regulating generator 68, which is similar in structure and function to the rotating regulator generator 20. The armature current of the close-line motor 10 controls the excitation of the lower output terminals of the regulator 68 through the field winding 70 in series with the armature winding of the close-line motor 10.

The current limit field winding 46 is utilized to limit the current flowing in the armature 11 of motor 12 to a predetermined value. The current limit is accomplished by connecting the output of the upper terminals of the armature 21 with the current limit field winding 46 and terminals 48 and 52 on rectifier bridge 50. The other terminals of the bridge rectifiers 50 are connected across a selected portion of potentiometer 58 which is supplied with the bias voltage which determines the current limit value. A resistor 60 is also connected across terminals 52 and 58. The voltage across the resistor 60 is in opposition to the voltage from the bias source of potentiometer 58 and must exceed that voltage before any current can flow in the current limit field winding 46. Since winding 46 is excited by the output of the upper pair of output terminals of regulator 20 which in turn has a component of excitation from the lower pair of output terminals of this regulator 20, which latter output depends upon excitation of field 22 with the load current of motor 12, there is no signal in current limit field winding 46 unless a predetermined current (determined by the biasing voltage) in the armature 11 of motor 12 is exceeded.

The current limit field 46 is in opposition to the pattern field winding 40. When the motor load reaches a predetermined maximum, the current limit field winding 46 is excited to prevent the load current from exceeding the maximum. The voltage field 42 also is in opposition to the pattern field winding 40 during normal operation. The signal input to the load balance field winding 44 is zero for most operating conditions with the bucket closed.

The close-line motor 10 has control components which are similar to those described for the hold-line motor and which operate in a similar manner.

The rotating regulator 68, like regulator 20, has a current field winding 70 which is energized by the current flowing through the armature 19 of the close-line motor 10. The rotating regulator 68 also has a current field winding 74 which is energized from the voltage across the lower terminals of its armature 67 so that it is excited as a function of the current in the armature 19 of close-line motor 10. A pattern field winding 76 is provided and it is excited from the same control source that excites the pattern fields 28, 90 and 40 of rotating regulators 20, 82 and 32 respectively. The rotating regulator 68 has in addition a control field winding 78 which is responsive to a control source which is controlled by close-line drum controller 80.

The rotating regulator 82, which corresponds to rotating regulator 32 in the hold-line control circuit, is provided in the close-line control circuit to directly control the excitation of separately excited field winding 66 of the close-line generator 62.

A biasing source is applied across potentiometer 112 in the same manner as the biasing source is applied across potentiometer 58 in the hold-line generator control circuit. A current limit circuit is provided by the cooperating bridge rectifier circuit 97 in the same manner as described for the corresponding circuit in the hold-line control system. The current limit field winding 98 is in opposition to the pattern and control field windings 90 and 96. When the load of motor 10 reaches a predetermined maximum, the output of the lower pair of output terminals of regulator 68 sufficiently excites winding 74 associated with the upper pair of output terminals that thereby overrides the excitation of field 98 thereby overrides the biasing source voltage across potentiometer 112 to prevent the load current from exceeding the maximum.

It will be noticed that load balance field winding 44 of rotating regulator 32 and load balance field 94 of rotating regulator 82 are connected in series with each other and that the outputs of the armature 67 of rotating regulator 68 at the lower terminals is connected to the output of armature 21 of rotating regulator 20 at the lower terminals. The outputs of the rotating regulator 20 and rotating regulator 68 which are connected together as just described are connected in opposition and connected across the load balance field windings 44 and 94. That is, a circuit is formed which includes armature 67 of rotating regulator 68, load balance field winding 94 of rotating regulator 82, load balance field winding 44 of rotating regulator 32, lead 114 through contacts 118 when load balance contactor 120 is closed through lead 122 to the armature 21 of rotating regulator 20, back to the armature 67 of rotating regulator 68. Since the outputs in this circuit of rotating regulators 20 and 68 are in opposition, there will be no current flowing around this circuit when the loads of motors 12 and 10 are equal, and hence there will be no signal input to the load balance field windings 44 and 94 when the loads of the motors are balanced. Any difference in load, however, between the hold-line motor 12 and the close-line motor 10 is detected by the rotating regulators 20 and 68, which in turn will cause a current to circulate through the load balance field windings 44 and 94. The polarity of the signal is such that the drive with the larger load has its generator voltage reduced while the opposite drive receives an increase in excitation. This is true for positive loads. For overhauling loads, the polarity is reversed so that load balance may still be maintained, raising the excitation on the generator with the larger load.

Since handling an empty bucket is very critical in that if as little as 4% of the total weight being supported is being held by the close-line 2, it is sufficient to close the bucket 1. Therefore, it is necessary when handling an empty bucket or for operation with the bucket open, that the system regulate for load unbalance rather than load balance. This condition obtains when contacts 124 are closed by contactor 126 and the contacts 118 are open.

The load unbalance circuit consists of the output of armature 67 of rotating regulator 68 which appears between the lower terminals, a limiting resistor 128, a rectifier 130 and the load balance field winding 44 of rotating regulator 32, and load balance field winding 94 of rotating regulator 82. It will be seen that for the conditions just described, the part of the output of the rotating regulator 20 for the hold-line control system which appears between the lower terminals of the armature 21, is removed from the circuit, changing the system to one that tends to regulate for load unbalance, shifting the major portion of the load to the hold-line drive motor 12.

The desideratum is to be able to raise and lower the bucket 1 while the bucket remains either open or closed, and to be able to open and close the bucket without raising or lowering, and if the bucket is raised or lowered when full, it is desirable to have the hold-line 4 and close-line 2 share the load equally. This result has been achieved very effectively in the present control system. The control system also provides that if the bucket was last in the open position, the bucket will remain open as it is raised or lowered, and if the bucket was last in the closed position, it will remain closed while being raised or lowered, unless, of course, both controls are operated.

The operation is as follows: If leads 142 and 152 are energized and the main generators 14 and 62 are running at the required speed, and starting switch 140 is still in the open position, a circuit will be completed from energized lead 142 through the coil on contactor 146 through contact 148 on contactor 150 to negative lead 152. Contactor 146 will then pick up, closing contacts 154 and 156, contact 154 removes part of the resistance of resistor 27 from the circuit which contains current field winding 26 of rotating regulator 20, making the current field more sensitive, and contact 156 removes the biasing potential from the circuit containing current limit field winding 46, which effectively eliminates the current limit value or limits the current in the hold-line motor 12 to zero (i. e. reduces the current flow due to a generator residual of generator 32). Another circuit may be traced from lead 142 through contacts 160 on contactor 162, through coil on contactor 170, to lead 152. Thus contactor 170 picks up to close its hold in contacts 174 and to close contacts 172, which completes the circuit from the main hold-line generator 14 through the armature 11 of the hold-line motor 12.

Corresponding circuits are set up for the close-line control system in the following manner. When leads 142 and 152 are energized, a circuit is established from lead 142 through the coil of contactor 216, contacts 208 on contactor 204 to lead 152. Contactor 216 is a fast acting contactor and thus picks up ahead of other contactors that are energized when the leads 142 and 152 are energized. The operation of contactor 216 opens the contacts 220 to prevent the energization of the coil of the empty bucket relay 242. The loaded bucket relay 240 is thus energized.

The circuit for the loaded bucket relay may be traced from lead 142 through segment 226, the coil of the loaded bucket relay 240, contacts 250 on the empty bucket relay 242 to lead 152. This relay thus opens contacts 238 and closes contacts 252.

The operation of contactor 216 also closes the contacts 218. This operation shorts out the resistor 198 and thus effects a forcing action on contactor 204. The circuit for contactor 204 may be traced from lead 142 through the contacts 218, contacts 200 on the voltage relay, or contactor 202, the coil of contactor 204 to lead 152. Contactor 204 thus picks up to close contacts 212, the hold in contacts, and to close contacts 210 to connect the close-line motor armature 19 in the circuit with the close-line generator 62.

The contactor 204 also opens contacts 203 to deenergize the contactor 216 and thus open the contacts 218 and close contacts 220. The opening of contacts 218 inserts the resistor 198 back in the circuit for contactor 204 but this contactor remains picked up on the lower current value in its coil circuit. The closure of contacts 220 does not effect the energization of contactor 242 because contacts 238 are now open.

Another circuit is established from lead 142 through the coil of contactor 188 and contacts 190 to lead 152. Contactor 188 is thus picked up closing the contacts 194 and 196 to effectively reduce the current limit to zero and increase the sensitivity of the current field winding 74. The system is now set up for load balance with the fields 18 and 66 of hold-line generator 14 and close-line generator 62, respectively, deenergized.

Assume the bucket is up and closed and it is desired to lower the material handling bucket 1, the switch 140 is closed and the master drum controller 37 is moved to the first position lower. In the first position lower, segment 290 effects the energization of leads 300 and 304 from leads 142 and 298. The energization of lead 300 establishes a circuit from lead 300 through contacts 256, the coil on load balance contactor 120, lead 254 through contacts 252 to lead 152, thus closing the contacts 118 to complete the load balance circuit. This load balance circuit may be traced from a lower terminal on the armature 21 of the rotating regulator 20 through lead 122, contacts 118, lead 114, load balance field winding 44 on the regulator 32, load balance field winding 94 on the regulator 82, the lower terminals of the armature 67 of the rotating regulator 68 back to the lower terminals on the armature 21 of rotating regulator 20. When load balance contactor 120 is picked up, it also opens contact 302, which insures that the coil on contactor 126 cannot be energized.

The energization of lead 304 establishes a circuit from this lead 304, through the coil on contactor 150 to lead 152. Contactor 150 is then picked up, closing contacts 308 and 310 and opening contact 148. When contactor 148 is open, it breaks the circuit which energizes the coil of contactor 146, thus opening contacts 154 and 156 which puts the current limit control back into operation in the hold-line motor control system.

Closing contact 308 completes the circuit through coil 314 of the brake 8 for the hold-line motor 12. This releases the brake of the hold-line system to allow the hold-line motor to rotate when energized.

Segment 292 causes a circuit to be energized from lead 320 to a junction 322 between pattern field winding 40 of rotating regulator 32 and pattern field winding 90 of rotating regulator 82. The pattern field winding 40 of rotating regulator 32 is in series with the pattern field winding 28 of rotating regulator 20 and the circuit goes from there to a junction 324 between pattern field winding 28 and pattern field winding 76 of rotating regulator 68 which is in series with pattern field winding 90 of rotating regulator 82. A lead 326 goes from the junction point 324 between pattern field 28 and pattern field winding 26 through segment 294, all of the sections of resistor 325 to lead 152. Thus, a control source is supplied to the pattern field windings of the rotating regulators.

When the pattern field windings are energized, a voltage is supplied to the field windings 18 and 66 of the hold-line generator 14 and the close-line generator 62, respectively, so a voltage begins to build up which will cause the motors to rotate in the direction selected by the drum controller and since the load balance circuit is in, the bucket would be lowered with the hold-line 4 and the close-line 2 sharing an equal part of the load. To accomplish this brake 6 must be released. The coil 330 of brake 6 may be traced from lead 142, through lead 298, segment 290, lead 304, segment 224 of controller 80, lead 334, through contacts 201 on contactor 202, lead 337, the coil on contactor 192 to lead 152. Contacts 191 are thus closed to establish a circuit for the coil 330, which circuit may be traced from lead 142 through switch 140, lead 141, coil 330 and contacts 191 to lead 152. When relay 192 is picked up, contacts 190 are opened to thus break the circuit of the coil of contactor 188 and allows contacts 194 and 196 to drop out and thus set up current limit in the close-line motor control system, as was done by contactor 146 and its contacts 154 and 156 for the hold-line motor control system.

As the voltage of the hold-line generator 14 builds up, it energizes the coil of contactor 162 which is connected directly across the generator at a selected voltage value. This operates to open contacts 160 and to close contacts 164 and contacts 166. Opening of contacts 160 has at this time no effect since the coil of contactor 170 is locked in the circuit. The closing of contact 164 completes the circuit from lead 142 through the coil of contactor 150 to lead 152. This simply serves to hold the contactor 150 in the circuit independent of segment 290, as the coil of contactor 150 was already energized as has been explained previously. The closing of contacts 166 on contactor 162 simply serves to complete a circuit through the coil of load balance contactor 120 which has already been energized as explained previously, thus providing a holding circuit which is also independent of segment 290, for that coil. It will be noticed that it would also provide a holding circuit for the coil of empty bucket contactor 126 if it should be in instead of the coil of load balance contactor 120.

Since the pattern field windings 28 and 40 in the hold-line motor control system are now energized with the polarity described, and the pattern field windings 76 and 90 in the control system for the close-line motor 10 are also energized, the motors 12 and 10 will rotate in a direction to reel out the cables 4 and 2 and lower the bucket 1, and since the system is set up for load balance, as has been previously described, the hold-line cable 4 and the close-line cable 2 will carry substantially equal shares of the load and thus the motors will carry equal load. In the first position lower for master drum controller 37, the pattern field windings are energized through a circuit which contains a resistor 325 in series with the fields. This provides the slowest speed of lowering. In the second position lower segment 296 shunts out part of the series resistor 325 and putting a greater portion of the input voltage across the pattern field windings, which produces an increased speed. In the third position lower, the speed is further increased since segment 296 shunts out the entire resistor 325.

The bucket 1 is raised in a manner similar to that just described for lowering, except the master drum controller 37 is rotated in the opposite direction and segments 274, 276, 278, 280 rotated into the terminals rather than segments 290, 292, 294 and 296. Segment 274 completes exactly the same circuits as segment 290 completes for the lower position. In the first position raise, segments 276, 278 again put the pattern field windings 28 and 40 of the control system of the hold-line motor 12 and pattern field windings 76 and 90 of the control system for the close-line motor 10 in series with resistor 325 across leads 142 and 152. Segments 276 and 278, however, connect the pattern field windings to the source with a reverse polarity. In the second and third raised positions of drum controller 37, the series resistor 325 is removed from the circuit in steps similar to that described for the lower position to thus increase the speed of raising.

Assume that we are preparing to lower the material handling bucket 1 onto the ore heap, and that it is closed. To open the bucket, the master close-line drum controller 80 is rotated in the open direction as indicated in Fig. 1A to the first position "open." With the drum controller 80 in the first position "open," the circuit at segment 224 is open, but this does not effect anything at this stage of operation. When the voltage of close-line generator 62 began to rise, the coil of contactor 202 was energized, which opened contacts 200 and 201 and closed contacts 197. The closure of contacts 197 completed a circuit from lead 142 through the contacts 197, lead 337, the coil of contactor 192, to lead 152. Contactor 192 then remained energized through segment 226 while master drum controller 80 was in a close position and when the controller 80 is moved to the first "open" position, the coil of contactor 192 also remains energized through segment 226. Rotation of segment 226 to the first position "open," deenergizes the coil of load balance relay 240, causing its contacts 238 to close and its contacts 252 to open. The opening of contacts 252 breaks the circuit of the coil of contactor 120. At the same time, the segment 226 establishes a circuit from lead 142 through segment 226, contacts 238, the coil of contactor 242, contacts 220 of contactor 216, to lead 152. Thus contactor 242 is picked up, opening contacts 250 which insures that a circuit will not be made through load balance relay 240. The closing of contacts 360 completes a circuit from lead 142, through contacts 166, lead 250, the coil of the empty bucket contactor 126, contact 302 of load balance contactor 120, lead 362, contacts 360 to lead 152. When the coil of contactor 126 is energized, contacts 256 are opened and the coil of the load balance contactor 120 cannot be energized. Contacts 122 are closed which sets up the control system for load unbalance so that the hold-line motor will bear most of the load.

The segments 352 and 354 establish a circuit which includes lead 366, control field 96, control field 78, lead 368, resistor 372 to lead 152. Succeeding positions of the drum controller will cause segment 356 to short out portions of the resistor 372 which is in series with the control field windings just recited to increase the excitation of said field windings and thus increase the speed of opening the bucket.

It will be noticed that when the drum controller is returned to the neutral position, the empty bucket and load balance relays 242 and 240 respectively and thus the empty bucket and load balance contactors 126 and 120 respectively are still energizable in the manner just described so that the bucket will remain open and the system will remain set up for load unbalance. If it is desired to have the bucket closed, the drum controller 80 is simply rotated in the direction indicated in Fig. 1A. This opens the circuit containing the coil of empty bucket relay 242 at segment 226, while a circuit is still maintained through the segment 226 for the coil of load balance relay 240, whereby the contactors 240, 242, 120, and 126, to be in the position described for lowering the bucket, set up the circuit for load balance so that the hold-line motor 12 and the close-line motor 10 will again share equal loads.

The closed segments 228 and 230 in all positions will complete the circuits to energize the control fields 78 and 96 in series with resistor 372 as did the segments 352 and 354 except that the energization voltage will be of a polarity which is opposite to the energization for opening the bucket 1. Segment 234 shorts out portions of resistor 372 in succession so that the pattern fields will receive increased energization with succeeding drum controller positions and the speed of the motor will be increased.

When the close-line drum controller 80 is in "close" position, or in the "open" position, the coil of contactor 192 is energized from lead 142, through segment 226, to the coil of contactor 192, and lead 152. When the hold-line drum controller is in either the raise or lower position, the coil of contactor 150 is energized from lead 142, lead 298, segment 274 or 290, lead 304, the coil of relay 150 to lead 152. These circuits insure that the mechanical brake for both the hold-line motor and close-line motor is released at any time the controls are set to operate the hold-line motor 12.

If the close-line drum controller is in a "run" position and the hold-line drum controller is in an "off" position, the coil 314 of the brake 8 for the hold-line motor 12 will not be energized and the material handling bucket 1 will simply be opened or closed. When the bucket 1 is closed, the system is set up for load balance so the close-line motor 12 may be used to raise the bucket by holding the close-line drum controller in the "close" position when the bucket 1 is already closed. In such case, the load-balance feature would cause the hold-line generator to build up a voltage and energize the coil of contactor 162 which closes a circuit from lead 142, through contacts 164 of contactor 162, the coil of contactor 150 to lead 152. Energization of the coil of relay 150 closes contact 308 which completes the circuit of the hold-line brake coil 314 to release the hold-line brake 8.

The circuit of coil 330 of the close-line brake 6 will be completed by contact 191 of contactor 192 at any time that the hold-line controller is in an "on" position to keep the close-line 2 at the right tension through the circuits previously described.

Thus, it is seen that the control system of the material handling bucket just described, and illustrated in Figs. 1 and 1A combined provides counterelectromotive force regulation, current limit, and load balance utilizing the rotating regulator described and illustrated in a copending application of Gerald E. Mathias and William T. Hunt, Jr., entitled "Electrical Control Apparatus," filed with this application and assigned to the same assignee, uses less equipment than would be required for previous systems designed to accomplish the same results. The saving in equipment results in a saving of space, weight and expense. One or all three of these factors are often extremely important in control systems of the kind described.

The circuit just described has power collectors designated in the loop circuit of each of the hold-line motor and generator (12 and 14) and the close-line motor and generator (10 and 62) which are designated by the numerals 3, 5, 7 and 9. In the control system diagrammatically illustrated in Fig. 2, a control system of the same general type is shown, but one of the power collectors has been eliminated. The system shown in Fig. 2, however, does not have the load balance feature as described for the system of Figs. 1 and 1A combined, and therefore requires the operator to simultaneously operate the hold-line drum controller 400 and the close-line drum controller 402 to obtain the correct distribution of load between the hold-line 404 and the close-line 406 in order to maintain the desired condition of the material handling bucket 408 while raising or lowering the bucket.

The hold-line motor 410 has its armature 412 in a series loop with the armature 418 of hold-line generator 416. The hold-line motor 410 has a separately excited field 414 which is energized from a constant potential source as was the field 13 of the hold-line motor 12 in the circuit of Figs. 1 and 1A. The hold-line generator 416 has a separately excited field 420 and a self-excited field 422 which are utilized in the same manner as the corresponding fields for hold-line generator 14 in Fig. 1, and the generator 416 controls the motor 410 in the same manner as described for the corresponding components of Fig. 1.

In like manner, the close-line motor 424 has armature 426 and a separately excited field 428. The close-line generator 430 has armature 432, a separately excited field 434, and a self-excited field 436. Again the armature 426 of motor 424 is connected in a loop circuit with the armature 432 of close-line generator 430 and the motor control is the same as previously described. Solenoid operated mechanical brakes 440 and 442 are provided for the hold-line and close-line control systems respectively, and are controlled in any suitable manner, such that the mechanical brakes will not be locked when either of the motors are to be operated. The power collector 444 is provided in the loop circuit of the hold-line motor 410 and generator 416 and the power collector 446 is provided in the loop circuit of close-line motor 424 and generator 430. The power collector 448 is common to both motor generator loops and thus one power collector which would normally be required in such a system is eliminated.

The hold-line control system is provided with a rotating regulator or amplifier 450 which is preferably operated substantially along its air gap line. The rotating regulator 450 is provided with a self-energizing field 452 which supplies a steady-state excitation required to maintain the existing output voltage. An anti-hunt field 454 is connected differential with respect to the self-energizing field and is used as a stabilizing field. A voltage field 456 which receives an excitation which is a measure of the voltage of the hold-line generator 416 is in opposition to the excitation provided by the pattern field 458 during normal operation. The pattern field 458 receives its excitation from the hold-line drum controller 400 as is provided by the operator.

The IR drop field 460 receives a signal which is proportional to the IR drop in its motor generator loop. It receives the signal from terminals 462 and 464 across the resistor 466. A resistor 468 is also provided in the loop circuit which contains the IR drop field 460, terminal 462, resistor 466, and terminal 464. A rotating regulator 470 is provided for the close-line control system which is of the same type as the rotating regulator 450 in the hold-line control system. Rotating regulator 470 has self-energizing field 472, anti-hunt field 474, voltage field 476, pattern field 478, and IR drop field 480, which are connected in the same manner and operate in the same way as the corresponding fields of the rotating regulator 450 in the hold-line system. The IR drop field 480 of rotating regulator 470 receives its IR drop signal from terminals 482 and 484 across resistor 486 in the loop circuit of generator 430. A resistor 488 is provided in the loop circuit which contains the IR drop field 480, terminal 482, resistor 486, terminal 484. The drum controllers 400 and 402 supply their respective pattern fields in the same way as did the hold-line drum controller in the circuit of Figs. 1 and 1A.

With the conventional counter E. M. F. regulator or modified voltage regulator type of regulating scheme, the difficulty with using a common line and a common power collector for two generator loops such as power collector 448 in the present control scheme occurs when one drive is to be operated without the other. In the conventional regulating schemes referred to, when either drive is at rest, the differential voltage field is allowed to reduce the residual generator voltage. Usually, the differential voltage field is strengthened when the drive is at rest by shortening a resistor which is in series with the voltage field. This action further reduces the residual voltage and hence the circulating current when the drive is at rest.

It will be seen, however, that if a common power collector is used in the two rotating regulator circuits, such as power collector 448 in the present scheme, and if one drive is at rest and the other operating, some current may circulate through the generator and motor that is at rest. This produces an IR drop in the generator armature which is detected by the voltage field. The system would then regulate to reduce the residual voltage, not realizing that the voltage drop being measured is due to an external voltage, not a residual voltage. The corrective effort, then, is made in a sense which tends to cause an increase in the current flow instead of a decrease.

The scheme illustrated in Fig. 2 overcomes the difficulty just described by utilizing the IR fields 460 and 480 to regulate for minimum circulating current instead of the usual voltage fields. The IR fields 460 and 480 are connected as previously described to provide the drooping speed with load characteristics required for systems of this type, and a segment 490 is provided on hold-line drum controller 400 and segment 492 is provided on close-line drum controller 402. The segment 490 on hold-line drum controller 400 closes a circuit between leads 494 and 495 which provides a short-circuit around resistor 468 when the hold-line drum controller 400 is in the "off" position, to increase the gain of current field 460 when the hold-line drive is at rest. The segment 492 on close-line drum controller 402 completes a circuit between leads 496 and 497 which places a short-circuit around resistor 488 is series with the IR field 480 for the rotating regulator 470 of the close-line control system.

With this scheme, each drive regulates for minimum circulating current even though the current may be from a source external to the immediate regulating system. Thus, it is seen one costly and heavy component which requires maintenance is eliminated without impairing the performance of the control system by the scheme illustrated and described herein.

The control system diagrammatically illustrated in Figs. 3 and 3A together combines the desirable features of the schemes diagrammatically illustrated in Figs. 1 and 1A together and Fig. 2. The main components of the system illustrated in Figs. 3 and 3A are the same as those shown in Figs. 1 and 1A together. The components bear identical numerals and are connected in the manner described for them in the description of the circuits of Figs. 1 and 1A. The circuit of Figs. 3 and 3A differs from the circuit of Figs. 1 and 1A in that the part of the hold-line motor generator loop which contains the power collector 5 and the part of the close-line motor generator loop which contains the power collector 7 is combined into a single lead which contains the power collector 500. The rotating regulator 32 of the hold-line control system has an additional field which is an IR field 502 connected in opposition to the pattern field 350. The IR field 502 is connected in series with a resistor 504 across the output of the lower terminals of the rotating regulator 20. The hold-line drum controller 27 has an additional segment 506 which is adapted to complete a circuit between leads 508 and 510 and thus short out the resistor 504 when the master hold-line drum controller is in the "off" position. A corresponding IR field 512 is provided for rotating regulator 82 in the close-line control system.

The field 512 is connected in series with a resistor 514 across the output of the lower terminals of rotating regulator 68. An additional segment 516 is provided on the master close-line drum controller 80 to complete a circuit between leads 518 and 520 when the master close-line drum controller 80 is in the "off" position.

Thus it will be seen that the IR fields 502 and 512 will cause their systems to regulate for minimum circulating current when their respective drive is at rest, just as the IR fields 460 and 480 in the circuit of Fig. 2 would for their respective control systems. The control system shown in Figs. 3 and 3A combined, then, will have all of the advantages described for the system shown in Figs. 1 and 1A and also the advantages described for the system shown in Fig. 3.

While in accordance with patent statutes the best known embodiments of the invention have been illustrated and described in detail, it is to be particularly understood that many other embodiments and applications fall within the spirit and scope of the invention.

I claim as my invention:

1. A control system for an electric drive motor comprising, a main generator for the drive motor and circuit means connecting the generator to the motor, excitation means for the main generator, a first and a second amplifying means for said excitation means, a first excitation control means for said second amplifying means, and a first output control means for said first amplifying means, said first excitation control means and said first output control means being connected to be responsive to a motor condition, second output control means for said first amplifying means connected to be responsive to a second motor condition, third output control means for said first amplifying means connected to be responsive to a third motor condition, second excitation control means for said second amplifying means connected in circuit relationship with a part of the output of the first amplifying means and a biasing means so that it is responsive to a fourth motor condition above a preselected value, and a control system for a second drive motor comprising, the corresponding elements, components, and connections as recited for the first drive motor, a first control source for the control system for the first drive motor, separate individual fourth output control means for the respective first amplifying means for the control systems for the said first and second drive motors, and individual third excitation control means for the respective second amplifying means for the control systems for the said first and second drive motors, said fourth output control means and said third excitation control means for the first and second rotating amplifiers respectively for the respective control systems being in circuit relationship with each other and said first control source for the purpose of determining the pattern excitation for the two control systems, individual separate fourth excitation control means for the respective second rotating amplifiers of the respective control systems for the first and second drive motors respectively, said fourth individual excitation control means being in circuit relationship with each other and a part of the outputs of the respective first amplifying means in opposition to each other to obtain a preselected degree of balance between the loads of the first and second drive motors.

2. A control system for an electric drive motor comprising, a main generator for the drive motor and circuit means connecting the generator to the motor, excitation means for the main generator, a first rotating amplifier, and a second rotating amplifier for said excitation means, said first rotating amplifier being a multipolar machine having one half of its poles excited independently from the other half so that two independent output voltages are obtained, each output voltage being proportional to the energization of one half of the poles, a first excitation control means for said second rotating amplifier, and a first output control means for said first rotating amplifier, said first excitation control means and said first output control means being connected to be responsive to a motor condition, second output control means for said first rotating amplifier connected to be responsive to a second motor condition, third output control means for said first rotating amplifier connected to be responsive to a third motor condition, second excitation control means for said second rotating amplifier connected in circuit relationship with a first independent output of the first rotating amplifier and a biasing means so that it is responsive to a fourth motor condition above a preselected value, and a control system for a second drive motor comprising, the corresponding elements, components, and connections as recited for the first drive motor, a first control source for the control system for the first drive motor, individual fourth output control means for separate first rotating amplifiers for the control systems for said first and second drive motors, and individual third excitation control means for the respective second rotating amplifiers for the control systems for the said first and second drive motors, said fourth output control means and said third excitation control means for the first and second rotating amplifiers respectively for the respective control systems being in circuit relationship with each other and said first control source for the purpose of determining the pattern excitation for the two control systems, individual separate fourth excitation control means for the respective second rotating amplifiers of the respective control systems for the first and second drive motors respectively, said fourth individual excitation control means being in circuit relationship with each other and the second outputs of the first rotating amplifiers connected to oppose each other to obtain a preselected degree of balance between the loads of the first and second drive motors.

3. A control system for an electric drive motor comprising, a main generator for the drive motor and circuit means connecting the generator to the motor, excitation means for the main generator, a first and a second amplifying means for said excitation means, a first excitation control means for said second amplifying means connected to be responsive to a motor condition, a first output control means for said first amplifying means connected to be responsive to a second motor condition, and a control system for a second drive motor comprising, components and connections as recited for the first drive motor, a first control source for the control system for the first drive motor, separate individual second excitation control means for the second amplifying means for the first and second drive motors in circuit relationship with said first control source for the purpose of determining the pattern excitation for the two control systems, individual separate third excitation control means for the respective second amplifying means of the respective control systems for the first and second drive motors respectively, said third individual excitation control means being in circuit relationship with each other and the outputs of the respective first amplifying means connected in opposition to each other to obtain a preselected degree of balance between the loads of the first and second drive motors.

4. A control system for an electric drive motor comprising, a main generator for the drive motor and circuit means connecting the generator to the motor, excitation means for the main generator, a first and a second amplifying means for said excitation means, a first excitation control means for said second amplifying means, and a first output control means for said first amplifying means, said first excitation control means and said first output control means being connected to be responsive to a motor condition, second output control means for said first amplifying means connected to be responsive to a second motor condition, third output control means for said first amplifying means connected to be responsive to a third motor condition, second excitation control means for said second amplifying means connected in circuit relationship with a part of the output of the first amplifying means and a biasing means so that it is responsive to a fourth motor condition above a preselected value, and a control system for a second drive motor comprising, the corresponding elements, components, and connections as recited for the first drive motor, a first control source for the control system for the first drive motor, a second control source for the control system for the second drive motor, separate individual fourth output control means for the respective first amplifying means for the control systems for the said first and second drive motors, and individual third excitation control means for the respective second amplifying means for the control systems for the said first and second drive motors, said fourth output control means and said third excitation control means for the first and second amplifying means respectively for the respective control systems being in circuit relationship with said first control source for the purpose of determining the pattern excitation for the two control systems, individual fourth excitation control means for the respective second amplifying means of the respective control systems for the first and second drive motors respectively, said fourth individual excitation control means being in circuit relationship with each other and a part of the outputs of the respective first amplifying means in opposition to each other to obtain a preselected degree of balance between the loads of the first and second drive motors, a fifth output control means for the first amplifying means of the control system for the second drive motor and a fifth excitation control means for the second amplifying means of the control system for the second drive motor, said fifth output control means and said fifth excitation control means being in circuit relationship with each other and said second control source.

5. A control system for an electric drive motor comprising, a main generator for the drive motor and circuit means connecting the generator to the motor, excitation means for the main generator, a first rotating amplifier, and a second rotating amplifier for said excitation means, said first rotating amplifier being a multipolar machine having one half of its poles excited independently from the other half so that two independent output voltages are obtained, each output voltage being proportional to the energization of one half of the poles, a first excitation control means for said second rotating amplifier, and a first output control means for said first rotating amplifier, said first excitation control means and said first output control means being connected to be responsive to a motor condition, second output control means for said first rotating amplifier connected to be responsive to a second motor condition, third output control means for said first rotating amplifier connected to be responsive to a third motor condition, second excitation control means for said second rotating amplifier connected in circuit relationship with a first independent output of the first rotating amplifier and a biasing means so that it is responsive to a fourth motor condition above a preselected value, and a control system for a second drive motor comprising, the corresponding elements, components, and connections as recited for the first drive motor, a first control source for the control system for the first drive motor, a second control source for the control system for the second drive motor, individual fourth output control means for separate first rotating amplifiers for the control systems for said first and second drive motors, and individual third excitation control means for the respective second rotating amplifiers for the control systems for the said first and second drive motors, said fourth output control means and said third excitation control means for the first and second rotating amplifiers respectively for the respective control systems being in circuit relationship with each other and said first control source for the purpose of determining the pattern excitation for the two control systems, individual separate fourth excitation control means for the respective second rotating amplifiers of the respective control systems for the first and second drive motors respectively, said fourth individual excitation control means being in circuit relationship with each other and the second outputs of the first rotating amplifiers connected to oppose each other to obtain a preselected degree of balance between the loads of the first and second drive motors, a fifth output control means for the first amplifying means of the control system for the second drive motor and a fifth excitation control means for the second amplifying means of the control system for the second drive motor, said fifth output control means and said fifth excitation control means being in circuit relationship with each other and said second control source.

6. A control system for an electric drive motor comprising, a main generator for the drive motor and circuit means connecting the generator to the motor, excitation means for the main generator, a first and a second amplifying means for said excitation means, a first excitation control means for said second amplifying means connected to be responsive to a motor condition, a first output control means for said first amplifying means connected to be responsive to a second motor condition, and a control system for a second drive motor comprising, components and connections as recited for the first drive motor, a first control source for the control system for the first drive motor, a second control source for the control system for the second motor, separate individual second excitation control means for the second amplifying means for the first and second drive motors in circuit relationship with said first control source for the purpose of determining the pattern excitation for the two control systems, individual separate third excitation control means for the respective second amplifying means of the respective control systems for the first and second drive motors respectively, said third individual excitation control means being in circuit relationship with each other and the outputs of the respective first amplifying means connected in opposition to each other to obtain a preselected degree of balance between the loads of the first and second drive motors, fourth individual excitation control means for the second amplifying means of the control system for the second drive motor, said fourth individual excitation control means in circuit relationship with said second control source.

7. A control system for two individual motor generator loops comprising, a conductor common to both of the two individual motor generator loops, at least one individual amplifying means for each of the individual motor generator loops, separate individual control sources for the individual amplifying means, separate first individual excitation control means for each individual amplifying means connected to be controlled by the respective control sources, separate second individual excitation control means for each individual amplifying means connected to be responsive to a first condition of the motor in the motor generator loop controlled by the respective amplifying means, means for varying the impedance of the respective circuits containing the separate second individual excitation control means in response to the condition of the respective individual control sources.

8. A control system for two individual motor generator loops comprising, a conductor common to both of the two individual motor generator loops, at least one individual amplifying means for each of the individual motor generator loops, separate individual control sources for the individual amplifying means, separate first individual excitation control means for each individual amplifying means connected to be controlled by the respective control sources, separate second individual excitation control means for each individual amplifying means connected to be responsive to a first condition of the motor in the motor generator loop controlled by the respective amplifying means, means for varying the impedance of the respective circuits containing the separate second individual excitation control means in response to the condition of the respective individual control sources, separate third individual excitation control means for each individual amplifying means connected to be responsive to a second condition of the motor in the motor generator loop controlled by the respective amplifying means.

9. A control system for an electric drive motor comprising a main generator for the drive motor and circuit means connecting the generator to the motor, excitation means for the main generator, amplifying means for said excitation means, a multiple position switch, a first excitation control means for said amplifying means connected to be controlled by said multiple position switch, a second excitation control means connected to be responsive to a first condition of the motor and comprising impedance means, means connecting said impedance means with said multiple position switch for varying the impedance of said impedance means in response to the position of said multiple position switch, and a control system for a second drive motor comprising, corresponding elements, components, and connections as recited for the first drive motor, and a conductor common to both of the two individual motor generator loops.

10. A control system for an electric drive motor comprising a main generator for the drive motor and circuit means connecting the generator to the motor, excitation means for the main generator, amplifying means for said excitation means, a multiple position switch, a first excitation control means for said amplifying means connected to be controlled by said multiple position switch, a second excitation control means connected to be responsive to a first condition of the motor and comprising impedance means, means connecting said impedance means with said multiple position switch for varying the impedance of said impedance means in response to the position of said multiple position switch, third excitation control means for said amplifying means connected to be responsive to a second condition of the motor, and a control system for a second drive motor comprising, corresponding elements, components, and connections as recited for the first drive motor and a conductor common to both of the two individual motor generator loops.

11. A control system for an electric drive motor comprising, a main generator for the drive motor and circuit means connecting the generator to the motor, a conductor common to the circuit means connecting each generator to its respective motor, excitation means for the main generator, a first and a second amplifying means for said excitation means, a first excitation control means for said second amplifying means, and a first output control means for said first amplifying means, said first excitation control means and said first output control means being connected to be responsive to a motor condition, second output control means for said first amplifying means connected to be responsive to a second motor condition, third output control means for said first amplifying means connected to be responsive to a third motor condition, second excitation control means for said second amplifying means connected in circuit relationship with a part of the output of the first amplifying means and a biasing means so that it is responsive to a fourth motor condition above a preselected value, and a control system for a second drive motor comprising, the corresponding elements, components, and connections as recited for the first drive motor, a first control source for the control system for the first drive motor, a second control source for the control system for the second drive motor, separate individual fourth output control means for the respective first amplifying means for the control systems for the said first and second drive motors, and individual third excitation control means for the respective second amplifying means for the control systems for the said first and second drive motors, said fourth output control means and said third excitation control means for the first and second amplifying means respectively for the respective control systems being in circuit relationship with said first control source for the purpose of determining the pattern excitation for the two control systems, individual fourth excitation control means for the respective second amplifying means of the respective control systems for the first and second drive motors respectively, said fourth individual excitation control means being in circuit relationship with each other and a part of the outputs of the respective first amplifying means in opposition to each other to obtain a preselected degree of balance between the loads of the first and second drive motors, a fifth output control means for the first amplifying means of the control system for the second drive motor and a fifth excitation control means for the second amplifying means of the control system for the second drive motor, said fifth output control means and said fifth excitation control means being in circuit relationship with each other and said second control source, a sixth excitation control means for the second amplifying means of the control system for the second drive motor in circuit relationship with the part of the output of the first amplifier in the same control system which is in circuit relationship with the fourth individual excitation control means, first impedance means in circuit relationship with said sixth individual excitation control means and means for varying said first impedance means in response to a condition of said second individual control source, a fifth excitation control means for the second amplifying means of the control system for the first drive motor in circuit relationship with the output of the first amplifier in the same control system which is in circuit relationship with the fourth excitation control means, a second impedance means in circuit relationship with the said fifth excitation control means for the second amplifying means in the control system for the first drive motor, and means for varying said second impedance means in response to a condition of the respective individual control sources.

12. A control system for an electric drive motor comprising, a main generator for the drive motor and circuit means connecting the generator to the motor, a conductor common to the circuit means connecting each generator to its respective motor, excitation means for the main generator, a first rotating amplifier, and a second rotating amplifier for said excitation means, said first rotating amplifier being a multipolar machine having one half of its poles excited independently from the other half so that two independent output voltages are obtained, each output voltage being proportional to the energization of one half of the poles, a first excitation control means for said second rotating amplifier, and a first output control means for said first rotating amplifier, said first excitation control means and said first output control means being connected to be responsive to a motor condition, second output control means for said first rotating amplifier connected to be responsive to a second motor condition, third output control means for said first rotating amplifier connected to be responsive to a third motor condition, second excitation control means for said second rotating amplifier connected in circuit relationship with a first independent output of the first rotating amplifier and a biasing means so that it is responsive to a fourth motor condition above a preselected value, and a control system for a second drive motor comprising, the corresponding elements, components, and connections as recited for the first drive motor, a first control source for the control system for the first drive motor, a second control source for the control system for the second drive motor, individual fourth output control means for separate first rotating amplifiers for the control systems for said first and second drive motors, and individual third excitation control means for the respective second rotating amplifiers for the control systems for the said first and second drive motors, said fourth output control means and said third excitation control means for the first and second rotating amplifiers respectively for the respective control systems being in circuit relationship with each other and said first control source for the purpose of determining the pattern excitation for the two control systems, individual separate fourth excitation control means for the respective second rotating amplifiers of the respective control systems for the first and second drive motors respectively, said fourth individual excitation control means being in circuit relationship with each other and the second outputs of the first rotating amplifiers connected to oppose each other to obtain a preselected degree of balance between the loads of the first and second drive motors, a fifth output control means for the first amplifying means of the control system for the second drive motor and a fifth excitation control means for the second amplifying means of the control system for the second drive motor, said fifth output control means and said fifth excitation control means being in circuit relationship with each other and said second control source, separate sixth individual excitation control means for the respective individual second rotating amplifiers for the control systems of the first and second drive motors respectively, each in circuit relationship with the second output of the respective first rotating amplifier of the control system for its particular drive motor, an impedance means for said sixth excitation control means in the first drive motor control system, and an impedance means for said sixth excitation control means in the second drive motor control system, and means for varying said individual impedance means in response to a condition of the respective individual control sources.

13. A control system for an electric drive motor comprising, a main generator for the drive motor and circuit means connecting the generator to the motor, a conductor common to the circuit means connecting each generator to its respective motor, excitation means for the main generator, a first and a second amplifying means for said excitation means, a first excitation control means for said second amplifying means connected to be responsive to a motor condition, a first output control means for said first amplifying means connected to be responsive to a second motor condition, and a control system for a second drive motor comprising, components and connections as recited for the first drive motor, a first control source for the control system for the first drive motor, a second control source for the control system for the second motor, separate individual second excitation control means for the second amplifying means for the first and second drive motors in circuit relationship with said first control source for the purpose of determining the pattern excitation for the two control systems, individual separate third excitation control means for the respective second amplifying means of the respective control systems for the first and second drive motors respectively, said third individual excitation control means being in circuit relationship with each other and the outputs of the respective first amplifying means connected in opposition to each other to obtain a preselected degree of balance between the loads of the first and second drive motors, fourth individual excitation control means for the second amplifying means of the control system for the second drive motor, said fourth individual excitation control means in circuit relationship with said second control source, separate fifth individual excitation control means for the respective individual second amplifying means for the control systems of the first and second drive motors respectively each in circuit relationship with at least a part of the output of the respective first amplifying means of the control system for its particular drive motor, an impedance means for said fifth excitation control means in the first drive motor control system, and an impedance means for said fifth excitation control means in the second drive motor control system, and means for varying said individual impedance means in response to a condition of the respective individual control sources.

14. A load balance control system for a pair of mechanically connected motors comprising, a pair of mechanically interconnected motors, respective main generators connected to energize the respective motors, each main generator having a field winding, respective first regulating generators connected to said respective field windings of said main generators, each first regulating generator having at least one field winding, respective second regulating generators, each second regulating generator having an armature circuit and a field circuit, circuit means connecting said armature circuits in series opposition in a series loop circuit including each field winding of said first regulating generators, and circuit means connecting said respective field circuits of said second regulating generators to be energized in dependence of load current of said respective motors.

15. Apparatus as set forth in claim 14 in which each second regulating generator comprises a second armature circuit and at least one field winding therefor, and each first regulating generator comprises a current limit field winding, the respective current limit field windings being connected to said respective second armature circuits, and said respective field windings of said second armature circuits being connected to the respective first-named armature circuits of said respective second regulating generators.

16. Apparatus as set forth in claim 15 in which each field winding associated with said respective second armature circuits comprises an impedance device, and separate control means for varying the impedance of each impedance device.

References Cited in the file of this patent

UNITED STATES PATENTS 1,916,443    Shirk _____ July 4, 1933